United States Patent [19]

DeSaw

[11] Patent Number: 4,839,490
[45] Date of Patent: Jun. 13, 1989

[54] GAS SHIELDED METAL ARC WELDING TORCH FOR LIMITED ACCESS WELDING

[75] Inventor: Fred A. DeSaw, Columbus, Ohio
[73] Assignee: General Electric Company, Schenectady, N.Y.
[21] Appl. No.: 107,146
[22] Filed: Oct. 9, 1987
[51] Int. Cl.$^4$ .............................................. B23K 9/16
[52] U.S. Cl. ............................... 219/74; 219/137.31; 219/137.62
[58] Field of Search ................ 219/74, 137.31, 137.62, 219/137.44, 136, 137.2

[56] References Cited

U.S. PATENT DOCUMENTS

| | | | |
|---|---|---|---|
| 2,866,987 | 12/1988 | Kumagai | 219/137.44 |
| 4,133,469 | 1/1979 | DeSaw | 219/124.02 |
| 4,313,046 | 1/1982 | Henry et al. | 219/137.62 |
| 4,731,518 | 3/1988 | Parmelee | 219/137.31 |

*Primary Examiner*—E. A. Goldberg
*Assistant Examiner*—Lincoln Donovan
*Attorney, Agent, or Firm*—Jerome C. Squillaro

[57] ABSTRACT

A gas shielded metal arc welding torch for joining internal walls in a workpiece such as a compressor impeller having limited access to the internal joint to be welded. A torch body is provided for remote feeding of consumable electrode wire, electric welding power, shielding gas, and a supply of cooling water to and from a small torch head. The exterior of the torch head is adpated to contact the internal walls to be joined while electrically insulating the current carrying parts from the workpiece, and to direct the consumable electrode wire and shielding gas toward the joint to be welded. The torch head is supported from the torch body by an assembly of at least three mutually coaxial fluid conducting tubes carrying shielding gas and supplying and discharging cooling water to and from the torch head. Means are provided to spring bias the torch head toward the workpiece walls and guide the torch head while movement takes place between it and the workpiece. Such spring biasing means may include one or more of the mutually coaxial tubes or may include additional spring devices between the torch body and the torch head.

12 Claims, 5 Drawing Sheets

GAS SHIELDED METAL ARC WELDING TORCH FOR LIMITED ACCESS WELDING

BACKGROUND OF THE INVENTION

This invention pertains to gas shielded metal arc welding apparatus of the type using consumable wire electrode material to provide filler metal in an arc welding process requiring a supply of shielding gas and means for cooling of the torch head. More particularly, the invention relates to an improvement in such apparatus for welding internal walls in a workpiece having limited access to the joint to be welded.

Shielded gas metal arc welding apparatus of the type described above is conventional and well-known, and in commercial form usually comprises a hand-held insulated torch body with a closely attached torch head and means for feeding consumable wire electrode, electric power, and shielding gas through the handle of the torch body to the torch head. Such a welding process is abbreviated herein as a GMA process, which may optionally employ means to supply cooling water to and from the torch head. While conventional GMA apparatus is suitable for external welding, where the size of the torch does not matter, it is unsuitable for welding internal walls in the workpiece where limited access is provided to the welding area. A typical problem is the need to weld the internal blades of compressor impellers to an adjacent disk, and/or counter disk, where the only access to the weld joint is through the compressor discharge opening, usually having between 8 and 30 millimeter spacing between disks. An additional problem in welding compressor impellers is that the blade constantly changes shape and direction between the interior and exterior of the impeller, leaving a "blind" weld to be carried out.

One solution to this problem is disclosed in my U.S. Pat. No. 4,133,469 issued Jan. 9, 1979, which suggests a GMA welding apparatus using a flexible probe-type torch head which tracks the weld joint by means of a guide tube. An elongated U-shaped guide tube is bent to conform to the weld joint configuration with the "U" facing toward the joint between internal walls to be welded. A torch head attached to a flexible braided copper conductor sheath carrying electric power and enclosing plastic water cooling lines, an electrode wire guide tube and a gas tube. The torch head is inserted into the guide tube by the flexible sheath, and the torch head is pulled toward the discharge opening of the impeller by the flexible sheath. The guide tube maintains distance and attitude of the torch head with respect to the weld joint. One of the problems with the foregoing method is that guide tubes for every design welded must be made and kept on hand.

The present invention is an improvement in a limited access GMA welding apparatus which does not require guide tubes and is adaptable to various weld joint configurations.

Accordingly, one object of the present invention is to provide an improvement in GMA welding apparatus which is adapted to welding internal walls in a workpiece having limited access to the joint to be welded.

Another object of the invention is to provide a limited access GMA torch providing improved weld quality and reducing welding costs in the manufacture of compressor impellers.

DRAWING

The invention, both as to organization and method of practice together with further objects and advantages thereof, will best be understood by reference to the following description, taken in connection with the accompanying drawings, in which:

FIG. 1 is a simplified schematic diagram of a complete shielded gas metal arc welding system with the improved limited access welding torch of the present invention, FIG. 2 is an elevation drawing, partly in section, of my improved torch head, FIG. 3 is a section taken along lines III—III of FIG. 2, FIG. 4 is an end view of the torch head of FIG. 2, FIG. 5 is an elevation drawing, partly in section, of my improved torch body, FIG. 6 is an end view of the torch body of FIG. 5 directed along lines VI—VI, FIGS. 7 & 8 are cross-section views through the torch body taken along lines VII—VII, VIII—VIII, respectively, FIG. 9 is an axial view of a portion of a compressor impeller counter disk, and/or disk, FIG. 10 is a radial view of an assembled of compressor impeller disk and counter disk to be welded together, and FIGS. 11, 12, and 13 are schematic elevation drawings illustrating three alternative forms of spring biasing means.

SUMMARY OF THE INVENTION

Briefly stated, the invention is practiced by providing an improvement in GMA welding apparatus, comprising a fluid cooled torch head adapted to direct consumable electrode and shielding gas toward a joint to be welded, a torch body spaced a substantial distance from the torch head and having means for feeding electrode wire, electric power, shielding gas, coolant supply to and coolant discharge from the torch head, an assembly of at least three mutually coaxial fluid conducting tubes adapted to conduct shielding gas to, and electrical welding power and to conduct coolant to and from the torch head, the assembly being adapted to support the torch head from the torch body, and further including means for spring biasing the torch head against the workpiece walls while the weld is performed.

DESCRIPTION OF THE PREFERRED EMBODIMENT

Figure 1:
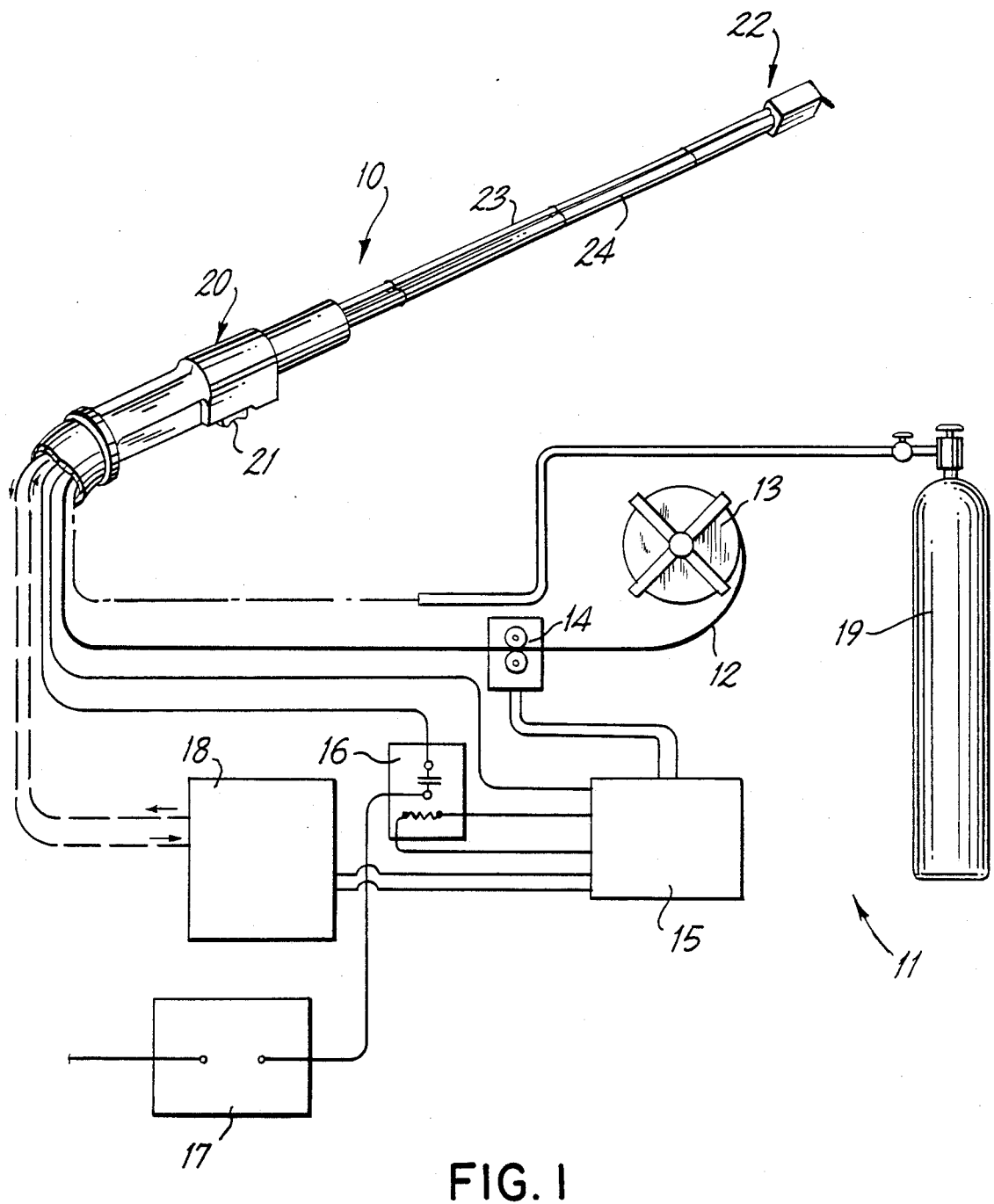

Referring now to FIG. 1 of the drawing, a simplified schematic view is shown of a limited access GMA welding torch 10, which is the object of the present invention connected to the various types of auxiliary devices needed to accomplish shielded gas metal arc welding with cooling, referred to herein as GMA supply system, and shown generally as 11. Consumable electrode wire 12 serving as weld filling material is fed from a wire reel 13 through a wire drive 14 operated from a control panel 15. Control panel 15 also operates a relay 16 connecting electric DC welding power from welding machine 17 to the welding torch 10, and further controls flow of cooling water from coolant system 18 to and from torch 10. A supply of inert shielding gas from a gas bottle 19 completes GMA system 11. Such GMA supply system is conventional and well-known in the art.

The limited access welding torch 10 comprises a torch body 20 with means such as a manual push button actuator 21 to control the supply of electric power, consumable electrode wire, shielding gas and coolant to a torch head remote therefrom designated by reference numeral 22. A wire insulating and guide tube 23 connected between the torch body 20 and torch head 22 conducts wire electrode to the torch head. An assembly of at least three mutually coaxial tubes designated at 24 supports torch head 22 at a substantial distance from the torch body in a manner to be described.

Figure 2:
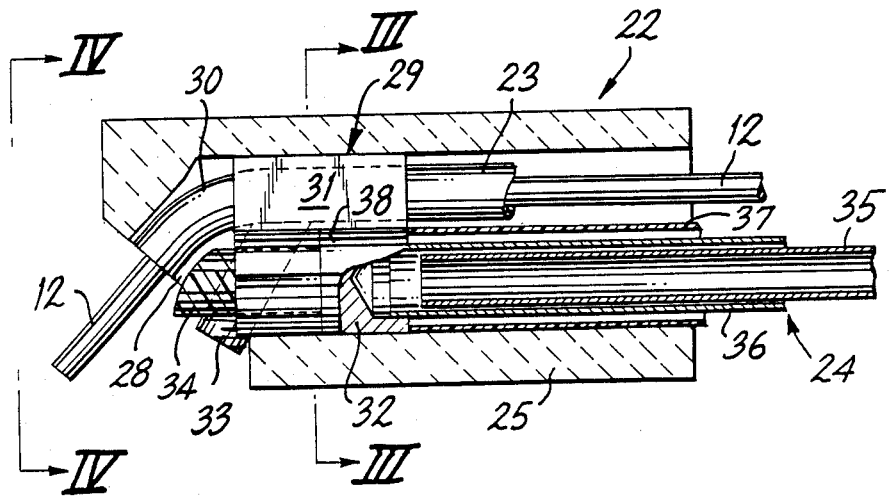
Figure 3:
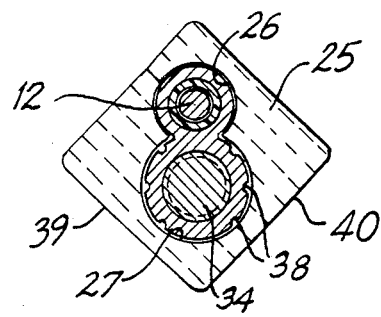
Figure 4:
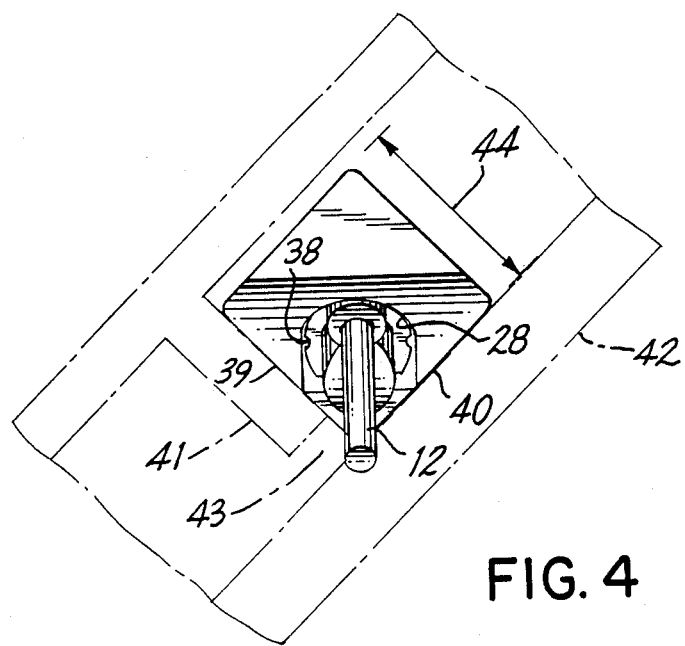

Referring now to FIGS. 2, 3, and 4 of the drawing, a preferred embodiment of the torch head 22 is described in detail. The outer portion comprises a ceramic gas cup 25 of substantially rectangular cross-section as shown in FIG. 3 defining parallel longitudinal passages 26, 27. Passages 26, 27 merge and terminate at a downwardly directed cup opening 28 at the front end of the torch head. Disposed in passages 26, 27 is an electrically conductive fluid cooled contact block assembly shown generally as 29 and made up of a curved copper contact tube 30, a contact tube holder 31, and a conductive cooling manifold 32. Contact tube 30 is curved so as to direct consumable wire 12 fed through tube 23 and into contact tube 30 in a proper attitude and direction toward the joint to be welded. Contact tube 30 is held in place in contact tube holder 31 by a set screw 33. The forward end of the manifold 32 is threaded as indicated at 34, and serves to attach contact tube holder 31 to the manifold 32.

Torch head 22 is supported by the tube assembly 24 shown in cross-section to comprise an inner copper coolant discharge tube 35, a central copper coolant supply tube 36 and an outer insulated shielding gas delivery tube 37 of material such as polytetraflouroethylene (Dupont trademark Teflon).

Central copper tube 36 is silver brazed to the cooling manifold 32 and also utilized as an electrical conductor to deliver welding power to the torch head. Outer tube 37 has an outlet providing shielding gas to a number of longitudinal slots 38 formed in the periphery of holder 31 and manifold 32. Slots 38 communicate with outlet 28 of the gas cup 25.

Referring to the end view of torch body 22 shown in FIGS. 3 and 4 it will be seen that the arrangement of the torch head is such as to minimize its size and especially adapted to limited access welding of internal walls. Internal passages 26 and 27 receiving the wire insulating and guide tube 23 and the tube assembly 24, respectively, are centered on a diagonal of a substantially square cross-section indicating width and breadth of gas cup 25. This diagonal bisects a first contact wall 39 and a second contact wall 40 intersecting at right angles. Wire rod 12 from contact tube 30 and shielding gas are directed downwardly toward the intersection of walls 39, 40 at the front end of the torch head and are arranged such that when contact walls 39 and 40 are in contact with internal walls of the workpiece, a welding rod will be fed at the proper attitude and direction toward the joint to be welded.

This is illustrated in FIG. 4 of the drawing, wherein the phantom lines illustrate a workpiece with first internal wall 41 and a second internal wall 42 arranged with respect to one another at a preselected angle and defining between them a joint 43 to be welded. When walls 39, 40 of the torch head are in contact with internal walls 41, 42, the welding wire 12 is fed in the proper direction with respect to joint 43. The width of the torch head as indicated at 44 is selected to be less than the spacing between disk and counterdisk. Here the width of the torch head is around 14 mm.

Figure 5:
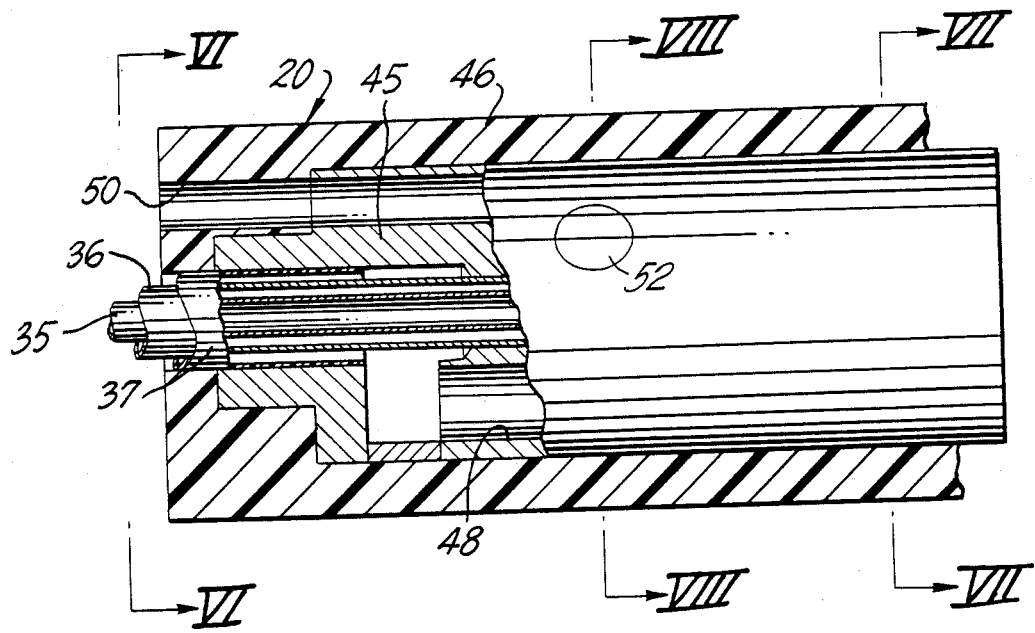

Referring now to FIG. 5 of the drawing, the torch body for remotely supplying the necessary materials for GMA welding and for supporting the torch head is shown in a preferred embodiment. Torch body 20 shown in FIG. 5 comprises an electrically conductive manifold 45 surrounded by an insulating red fiber shroud 46.

Figures 6, 7:
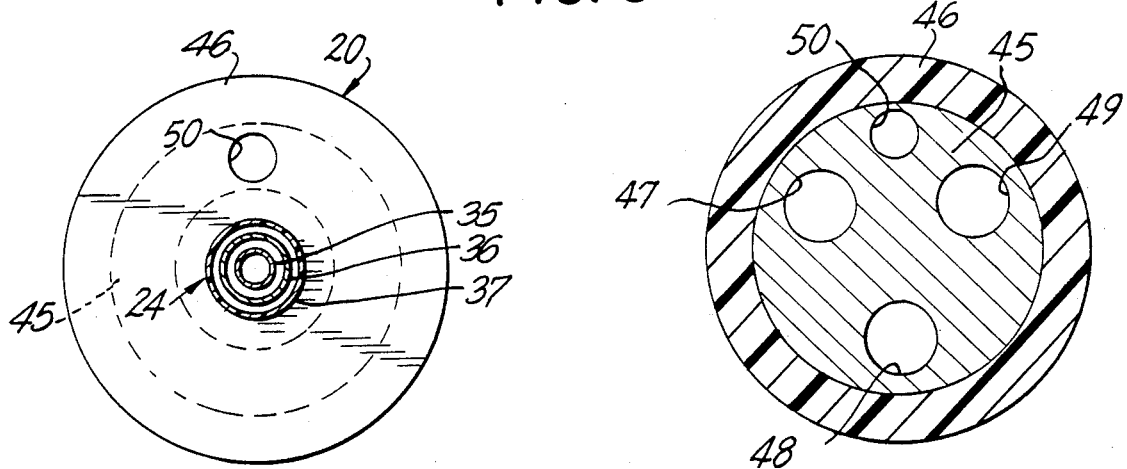
Figure 8:
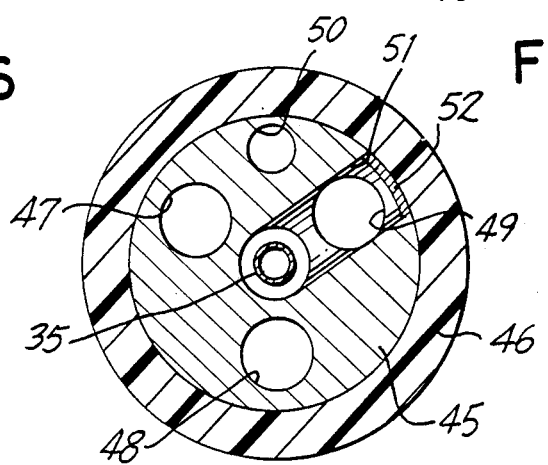

An end view of torch body 20 is shown in FIG. 6. As shown in the cross-section of FIG. 7, manifold 45 is circular in cross-section and has four longitudinal passages; passage 47 connected to GMA system II to receive a supply of coolant fluid, passage 48 connected to receive a supply of shielding gas, passage 49 conducting heated coolant away from the apparatus to GMA system II, and passage 50 receiving the electrode wire from GMA system II. The three longitudinal passages 47, 48, and 49 are connected to the interiors of mutually coaxial tubes 35, 37, and 36, respectively, by radial passages such as 51, and later closed by plugs such as 52, as illustrated in FIG. 8.

Figure 9:
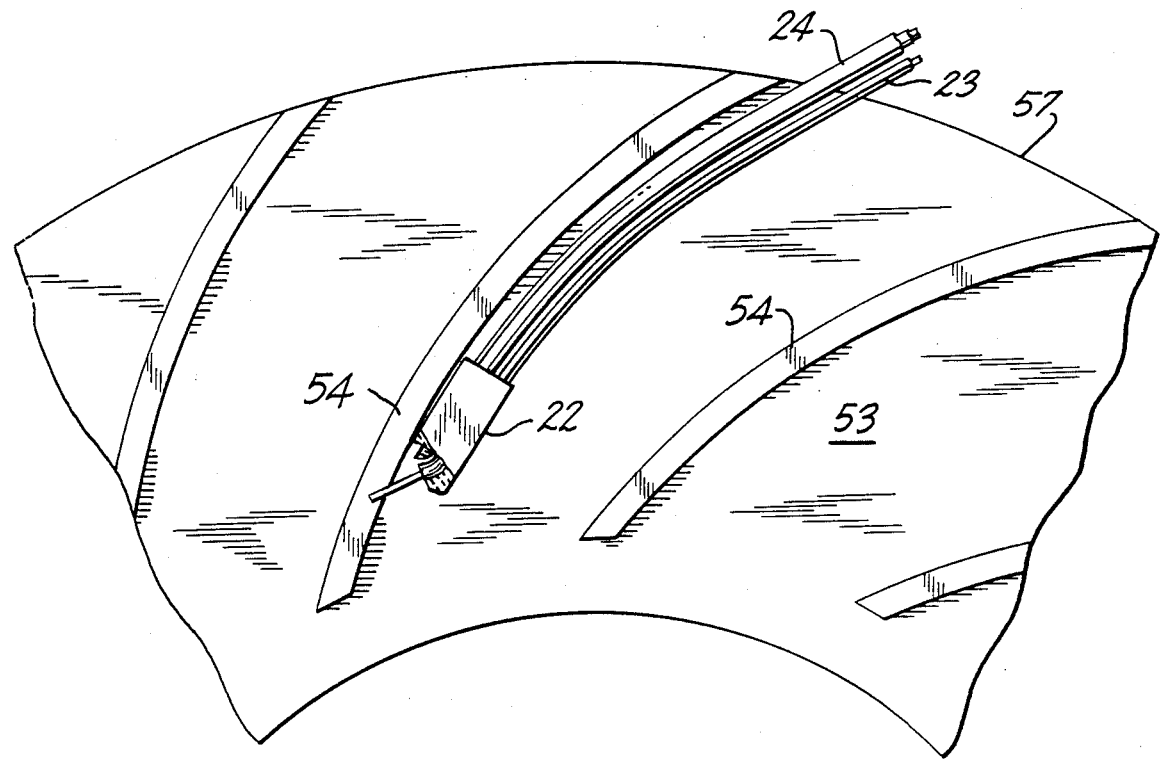
Figure 10:
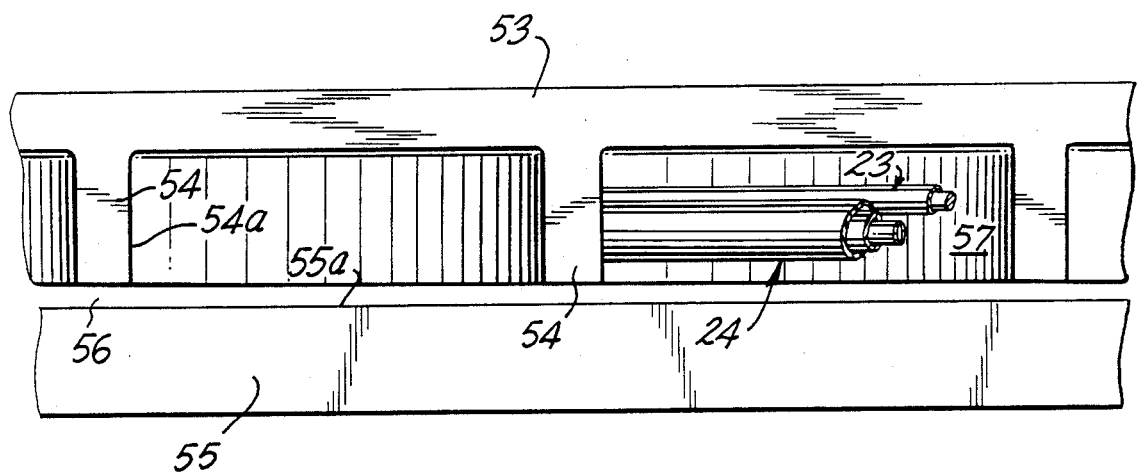

Referring to FIGS. 9 and 10 of the drawing, a workpiece is shown of a typical compressor impeller for which the invention is especially useful. FIG. 9 illustrates an axial view of a compressor counter disk and/or disk 53 having a plurality of circumferentially spaced curved impeller blades 54 which are formed by milling out the space between the blades to a depth typically between 8 and 30 millimeters.

FIG. 10 shows a radial view of counter disk and/or disk 53 and blades and/or counter disk 54 with an adjacent disk and/or counter disk 55 positioned for joining to the blades 54. Blade 54 and disk 55 define internal walls 54a and 55a arranged at a selected angle and defining a joint 56 to be welded. Access to the joint to be welded is only obtainable through a limited access opening 57 at the discharge opening of the compressor impeller. As seen in FIG. 9, welding torch head 22 is supported by the coaxial tube assembly 24 and spring biased against the internal walls by slightly bending the tube assembly 24. The torch head is withdrawn (or alternatively the workpiece is moved with respect to the torch head) while spring biasing torch head 22 against walls 54a, 55a (FIG. 10). The consumable electrode wire is fed to the torch head and welding is performed with the GMA process as the torch head is withdrawn.

In the embodiment shown in FIG. 9 and described in connection with the previous drawings, the means for spring biasing the torch head against the weld joint and internal walls is provided by the coaxial tube assembly itself. This is carried out by selection of material for one or both of the coolant tubes, which is both electrically conductive and has the proper spring characteristics. A preferred material for this purpose is beryllium copper. As an alternative one of the two coolant tubes may be electrically conductive and the other may be provided from springy metal tube material such as suitable to provide spring biasing.

Another alternative is to choose an outer gas supply tube of a composite laminate which provides spring biasing as well as insulating.

Figure 11:
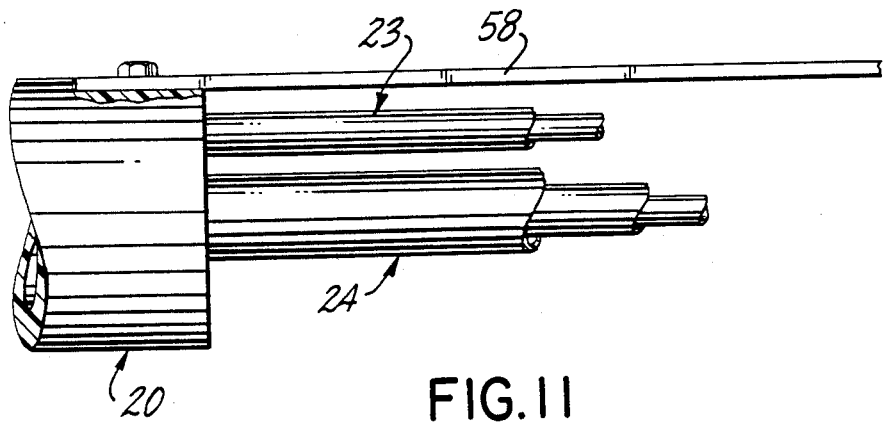
Figure 12:
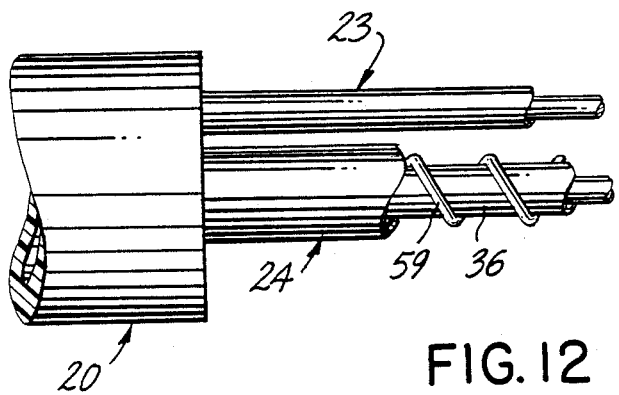
Figure 13:
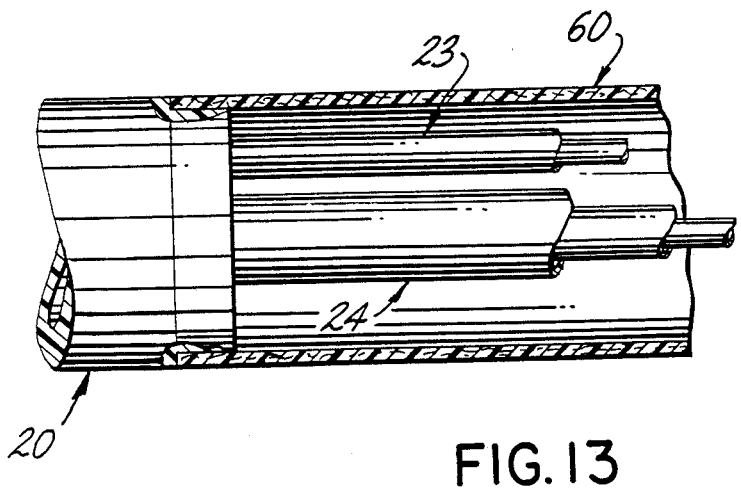

Various other alternative means are available for providing suitable means to allow spring biasing the torch head from the torch body. FIGS. 11, 12, and 13 illustrate such alternatives in simplified form. FIG. 11 shows a leaf spring 58 of insulating fiberglass or of steel having insulating material wrapped around or sprayed on. Spring 58 is attached at one end to the torch body 20 and at the other end to the torch head (not shown). The coaxial tube assembly 24 and wire insulating and guide tube 23 are as previously described.

FIG. 12 shows the torch body 20, tube assembly 24 and guide tube as before. However, the central copper coolant supply tube 36 has a helical spring 59 wrapped around it to give it additional spring characteristics. The helical spring 59 can also be used in combination with a central tube of beryllium copper.

FIG. 13 illustrates both coaxial tube assembly 24 and guide tube 23 inside an enclosing springy 60 of composit fiberglass construction or equivalent. Tube 60 extends between torch body 20 and torch head 22 (not shown) and provides spring biasing as well as further insulating the members and serving to prevent the tubes from becoming entangled in the workpiece.

In the foregoing description, reference to spacing the torch body a "substantial distance" from the torch body refers to the distance between the torch head when positioned at the interior limited access joint to be welded, and the torch body on the exterior of the workpiece where the torch body is manipulated. Such substantial distance is selected for a particular welding torch and should not be so great that the torch head is not supported, but should not be so short that the weld joint cannot be reached and the torch head biased against the joint. Typically, the distance between the torch head and the torch body is between 100 mm and 700 mm. On the other hand, the width of the torch head would only be on the order of 10 to 15 mm and not qreater than about 30 mm. The term "substantial distance" therefore is relative to the width of the torch body and within the scope of the present invention means at least 10 times the width of the torch body.

While there has been described herein what is considered to be the preferred embodiment of the invention, other modifications will occur to those skilled in the art and it is desired to secure in the appended claims all such modifications as fall within the true spirit and scope of the invention.

I claim:

1. An improved gas shielded metal arc welding torch for joining first and second internal walls in a workpiece defining between them a joint to be welded, said apparatus comprising:
   a fluid cooled electrically insulating torch head having external walls adapted to contact said internal workpiece walls and to direct consumable electrode wire and shielding gas toward said joint,
   a torch body spaced a distance at least 10 times the width of said torch body from said torch head and having means for controllably supplying consumable electrode wire, electric welding power, shielding gas, and coolant fluid,
   an assembly of mutually coaxial fluid conduction tubes connected to conduct shielding gas electric welding power, and coolant between said torch head and said torch body said assembly being adapted to remotely support the torch head from the torch body, and
   means for spring biasing the torch head against said internal walls from the torch body while a weld is performed.

2. The improvement according to claim 1, wherein said torch head includes an exterior electrically insulating gas cup having first and second exterior walls substantially perpendicular to one another and adapted to contact said first and second workpiece walls to position said torch head.

3. The improvement according to claim 1, wherein said tube assembly comprises an outer tube of insulating material containing shielding gas, a central tube, and an inner tube, at least one of the central and inner tubes comprises electrically conductive material containing coolant fluid and electrically connecting the torch head to the torch body, whereby electric welding power is conducted to said torch head.

4. The improvement according to claim 1, wherein at least one of said fluid conducting tubes is comprised of spring material to provide said spring biasing means.

5. The improvement according to claim 1, wherein said torch head includes an exterior ceramic gas cup of substantially square cross-section not exceeding thirty millimeters on a side and defining first and second longitudinal passages disposed on a diagonal of said square cross-section and having said electrode wire and said tube assembly disposed in said first and second passages respectively so as to insulate said electrode wire and said tube assembly from the workpiece and to position them relative to one another.

6. The combination according to claim 1, wherein said torch head and said torch body are spaced apart a distance between 100 and 700 millimeters.

7. The combination according to claim 1, wherein said spring biasing means comprises an insulating leaf spring connected between said torch head and said torch body.

8. The combination according to claim 1, wherein said spring biasing means comprises a helical spring wrapped around one of said fluid conducting tubes.

9. The combination according to claim 1, wherein said spring biasing means comprises an insulating springy tube enclosing said assembly of fluid conducting tubes and connected between said torch head and said torch body.

10. The combination according to claim 1, wherein said torch head comprises an exterior electrically insulating ceramic gas cup, an electrically conductive contact block assembly disposed in said gas cup arranged to receive said electrode wire, said contact block assembly also electrically connected to at least one of said fluid conducting tubes, whereby electric welding power is connected to said wire within said gas cup.

11. The combination according to claim 10, wherein said contact block assembly is also connected to one of said fluid conducting tubes containing shielding gas, and defines cooling passages to said gas to shield said electrode wire.

12. The combination according to claim 10, wherein said contact block assembly is connected to one of said fluid conducting tubes containing coolant fluid, whereby the contact block assembly is fluid cooled during welding.

* * * * *